US008054955B2

(12) United States Patent
Yamazaki

(10) Patent No.: US 8,054,955 B2
(45) Date of Patent: Nov. 8, 2011

(54) TELEPHONE SYSTEM, ASSOCIATED EXCHANGE, AND TRANSMISSION CONTROL METHOD

(75) Inventor: Atsushi Yamazaki, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 472 days.

(21) Appl. No.: 12/402,317

(22) Filed: Mar. 11, 2009

(65) Prior Publication Data

US 2009/0245238 A1 Oct. 1, 2009

(30) Foreign Application Priority Data

Mar. 26, 2008 (JP) .................... 2008-081019

(51) Int. Cl.
*H04M 15/00* (2006.01)
(52) U.S. Cl. ............... 379/112.08; 379/201.01; 379/232
(58) Field of Classification Search ............ 379/112.08, 379/201.01, 232
See application file for complete search history.

(56) References Cited

U.S. PATENT DOCUMENTS

| | | | |
|---|---|---|---|
| 6,882,653 B1 | 4/2005 | Kiuchi et al. | |
| 7,457,278 B2 | 11/2008 | Son et al. | |
| 2001/0003522 A1 | 6/2001 | Masuhiro | |
| 2005/0074026 A1* | 4/2005 | Soncodi et al. | 370/465 |
| 2005/0122930 A1* | 6/2005 | Zhao et al. | 370/328 |
| 2006/0013195 A1 | 1/2006 | Son et al. | |
| 2008/0181122 A1 | 7/2008 | Ruppelt | |

FOREIGN PATENT DOCUMENTS

| | | |
|---|---|---|
| JP | 11-308345 | 11/1999 |
| JP | 2000-312229 | 11/2000 |
| JP | 2001-156881 | 8/2001 |
| JP | 2002-158665 | 5/2002 |
| JP | 2003-258998 | 9/2003 |
| JP | 2004-179764 | 6/2004 |
| JP | 2004-186766 | 7/2004 |
| JP | 2005-039565 | 2/2005 |
| JP | 2005-123730 | 5/2005 |
| JP | 2005-136844 | 5/2005 |
| JP | 2006-157368 | 6/2006 |
| JP | 2006-166018 | 6/2006 |
| WO | WO 03/103259 | 12/2003 |
| WO | WO 2006/087291 | 8/2006 |

* cited by examiner

*Primary Examiner* — Quynh Nguyen
(74) *Attorney, Agent, or Firm* — Blakely, Sokoloff, Taylor & Zafman LLP

(57) ABSTRACT

According to one embodiment, a telephone system which realizes voice communication by using a packet network comprises an exchange which accommodates a telephone terminal as its extension and a call processing server which processes calls on the packet network. The exchange comprises a first trunk connected to the packet network, a second trunk connected to a public network having a different protocol from that of the packet network, a monitoring module which monitors the call processing server, and when a failure occurs in the call processing server, deactivates the first trunk, and a call control module which transfers a transmission request which is made from the telephone terminal to the packet network to the second trunk when the transmission request is made and performs a detour transmission to the public network in a status where the first trunk is inactive.

9 Claims, 6 Drawing Sheets

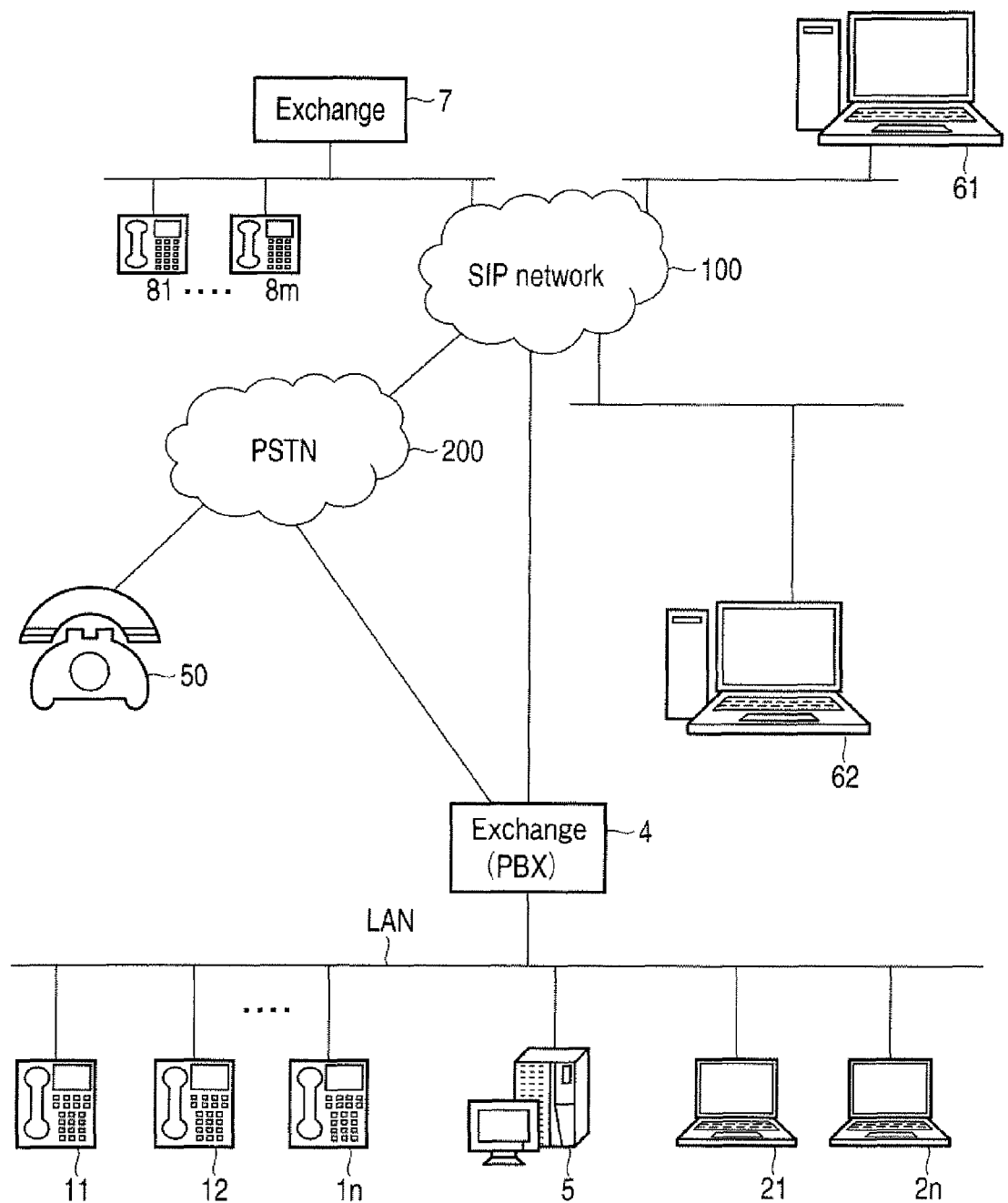
F I G. 1

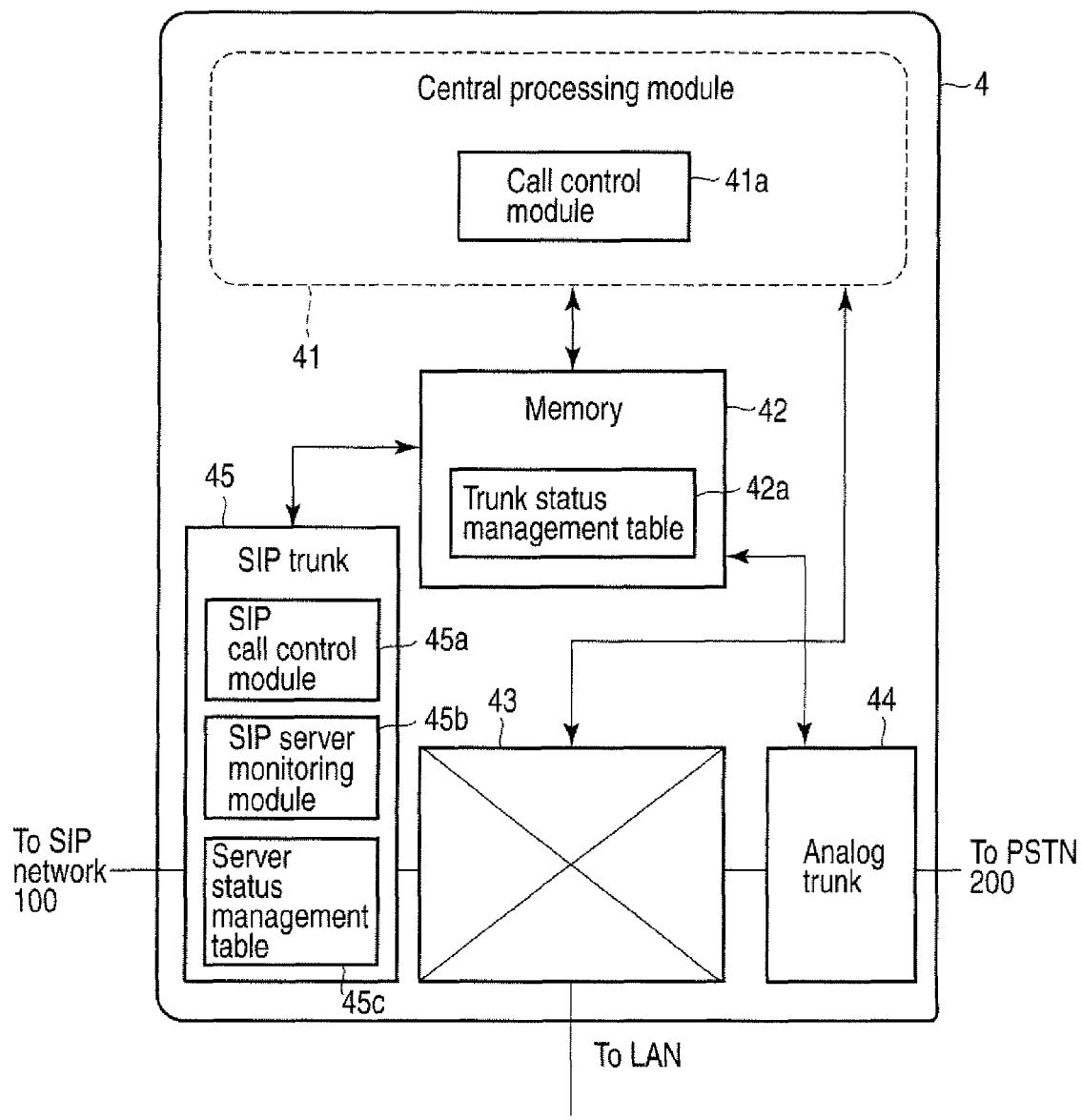
F I G. 2

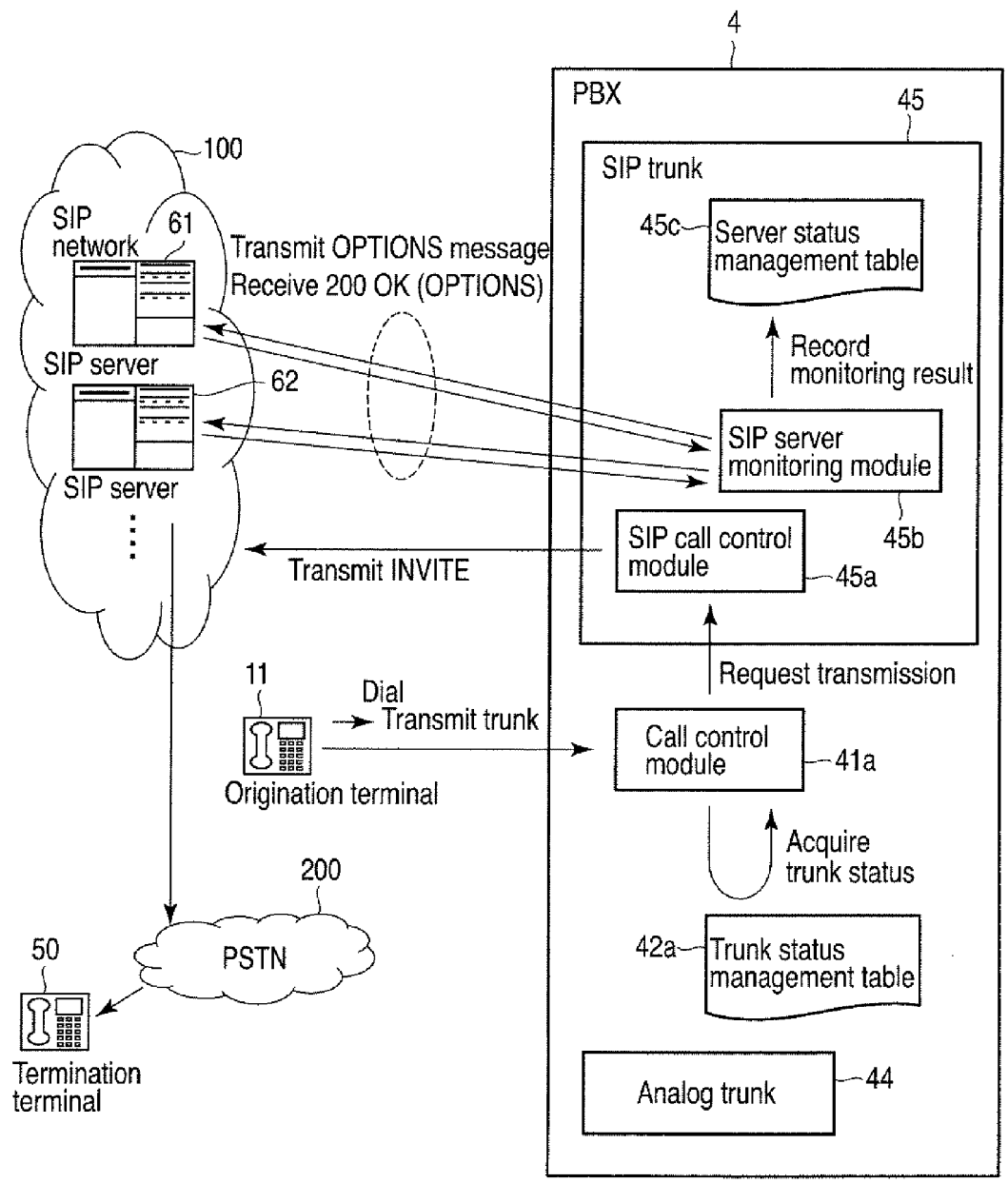
F I G. 5

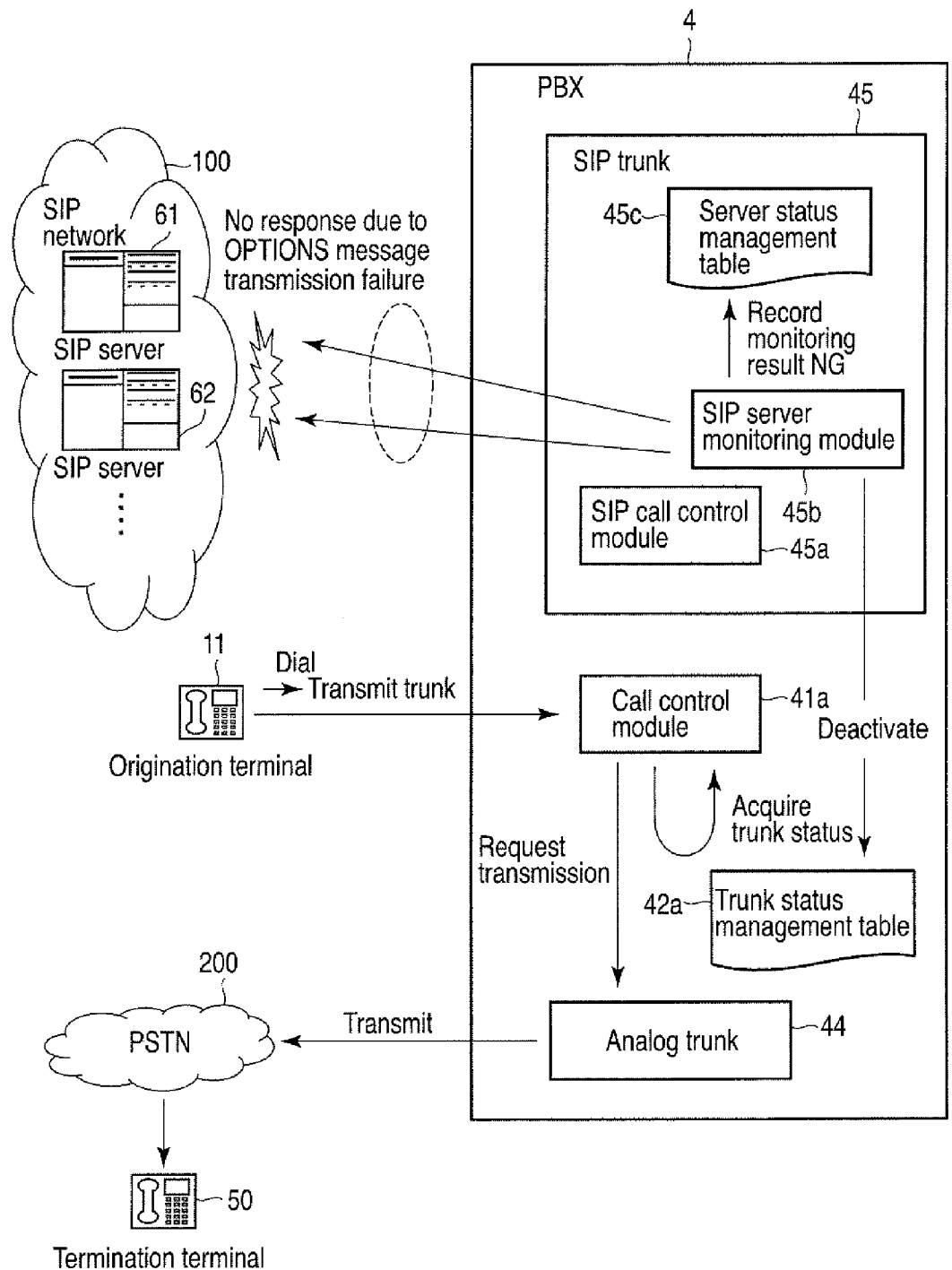
F I G. 6

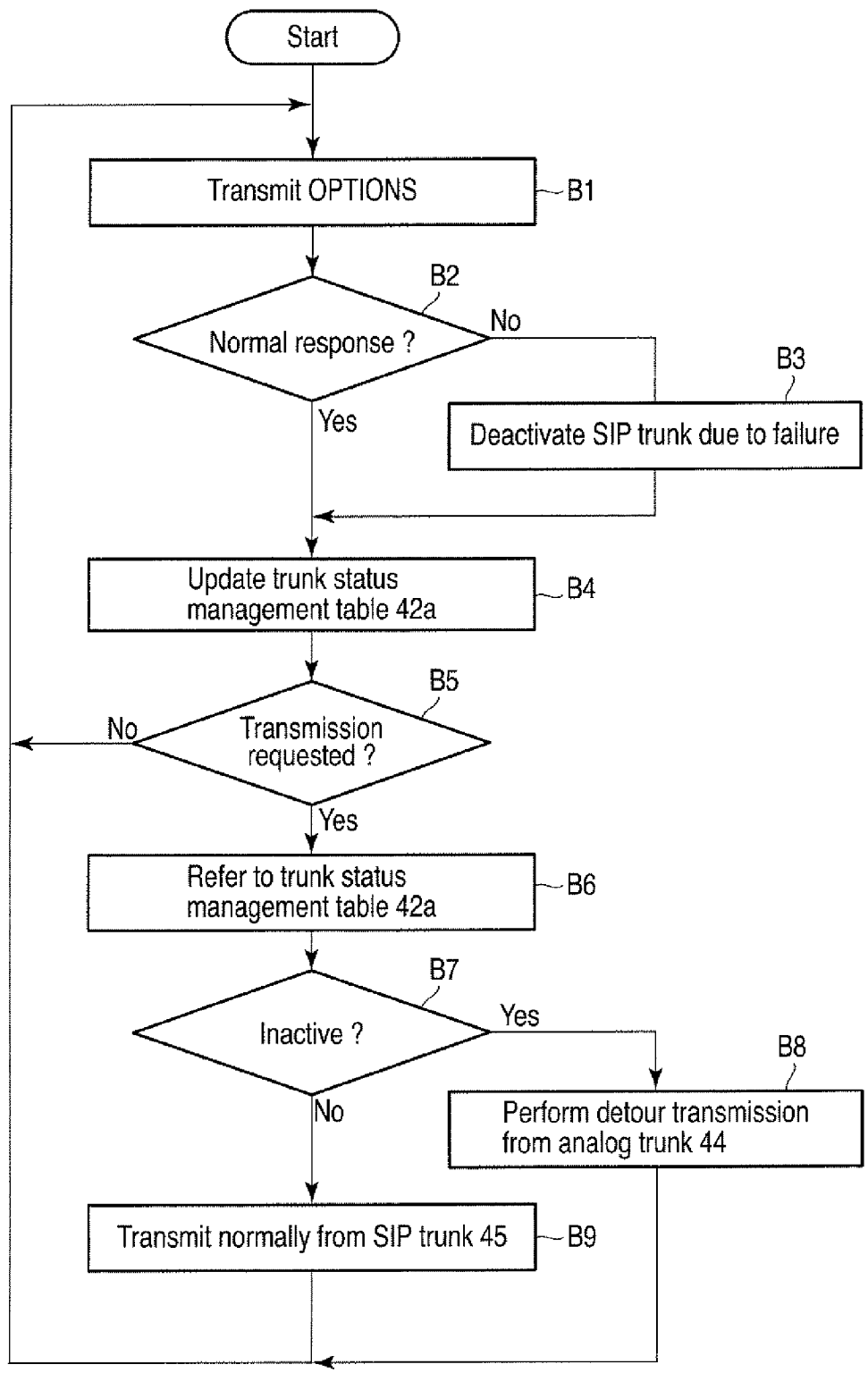
F I G. 7

TELEPHONE SYSTEM, ASSOCIATED EXCHANGE, AND TRANSMISSION CONTROL METHOD

CROSS-REFERENCE TO RELATED APPLICATIONS

This application is based upon and claims the benefit of priority from Japanese Patent Application No. 2008-081019, filed Mar. 26, 2008, the entire contents of which are incorporated herein by reference.

BACKGROUND

1. Field

One embodiment of the invention relates to a telephone system realizing voice communication via an Internet Protocol (IP) network, an exchange for use in the telephone system, and a transmission control method.

2. Description of the Related Art

A system which realizes voice communication by means of a best-effort network, such as the Internet, is well known. This kind of system is called a voice-over-IP (VoIP) or IP telephone system and is expected as a next-generation telephone system. Session Initiation Protocol (SIP) represents a protocol usable in this system. Providing a SIP processing function for a telephone set (hereinafter, referred to as an IP terminal) achieves various services unique to SIP. Of course, various IP terminals including conventional telephone sets having no SIP processing function may be connected to the SIP network.

The SIP network, since it is well suited to a local area network (LAN), is frequently configured as a private telephone network. In transmitting to an external network from the private network, a SIP message "INVITE" is transmitted to a SIP server, which handles an external network, through a SIP trunk of a private branch exchange (PBX).

If, at this time, the SIP server has failed, call control cannot be performed and a new communication link cannot be formed. To avoid this situation, the SIP server has a redundant configuration. If a non-response status continues after transmission of the SIP message to the SIP server, a caller accesses sequentially the next SIP server. However, if all the SIP servers have failed, the telephone system cannot transmit any SIP message from the SIP trunk. In this case, the telephone system has to switch to a detour transmission using another trunk (analog trunk, Integrated Services Digital Network [ISDN] trunk, etc.).

In the existing technique, a transaction timer default value of the SIP message (INVITE) is set to 32 seconds. If the caller cannot access all the SIP servers, the caller has to wait by the time length in which 32 seconds is multiplied by the number of SIP servers. Shortening the transaction timer value can make the time to start the detour transmission shorter, reducing how long the telephone system has to wait. To eliminate the waiting time, it is necessary for the PBX to recognize the status of the SIP trunk (or SIP server) before a transmission operation to allow the detour transmission to be performed immediately.

A method for checking statuses of SIP terminals from the SIP server has been disclosed (refer to Jpn. Pat. Appln. KOKAI Publication No. 2006-1660189). However, the technique of this reference document may not be applied to check statuses of SIP server or the SIP trunk from the SIP terminals. With reference to a result of registration that is a function of the SIP network, monitoring the status of the SIP server is a possible method. However, in recent years, the number of SIP networks having no registration functions has increased, so that the method of the above is not useful for a wide variety of purposes and lack of accuracy.

As mentioned above, the existing technique cannot determine the status of the SIP server by means of a general-purpose method before transmission. If a caller originates a call in a status in which the SIP server and the SIP trunk have failed, since the caller has to wait a long time until the detour transmission is established, some sort of countermeasure has been desired.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary system view depicting an embodiment of a telephone system of the invention;

FIG. 2 is an exemplary functional block diagram depicting an embodiment of a PBX 4 of FIG. 1;

FIG. 4 is an exemplary schematic view for explaining processing by a call control module 41a;

FIG. 5 is an exemplary schematic view depicting a SIP trunk transmission in a normal status of a SIP trunk 45;

FIG. 6 is an exemplary schematic view depicting transmission in a status in which the SIP trunk 45 is inactive; and FIG. 7 is an exemplary flowchart depicting a processing procedure of the PBX 4 of the embodiment of the invention.

DETAILED DESCRIPTION

Figure 3:
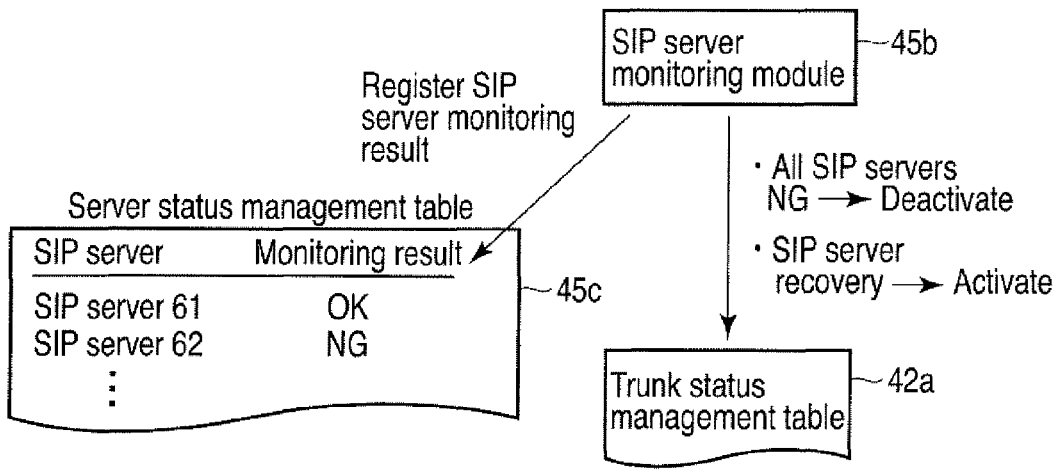
FIG. 3 is an exemplary schematic view for explaining processing by a SIP server monitoring module 45b.

Various embodiments according to the invention will be described hereinafter with reference to the accompanying drawings. In general, according to one embodiment of the invention, there is provided a telephone system which realizes voice communication by using a packet network comprising an exchange which accommodates a telephone terminal as its extension and a call processing server which processes calls on the packet network. The exchange comprises a first trunk connected to the packet network, a second trunk connected to a public network having a different protocol from that of the packet network, a monitoring module which monitors the call processing server, and when a failure occurs in the call processing server, deactivates the first trunk and a call control module which transfers a transmission request which is made from the telephone terminal to the packet network, to the second trunk when the transmission request is made and performs a detour transmission to the public network in a status where the first trunk is inactive.

According to an embodiment, FIG. 1 exemplary shows a system view illustrating an embodiment of a telephone system. In FIG. 1, IP terminals 11-1n, 5, 21-2n are connected with one another via a LAN to form a private telephone network. The IP terminals 11-1n are, for example, telephone sets. An IP terminal 5 is, for example, a softphone in which voice communication software is installed in a personal computer. The IP terminals 21-2n may be included in a category of softphone, and function as computers working together with the IP terminals 11-1n depending on setting.

The IP terminals 11-1n, 5, 21-2n are accommodated in the PBX 4 as extensions via the LAN. The PBX 4 is connected to a SIP network 100 and a public switched telephone network (PSTN) 200. Among them, the PSTN 200 includes a telephone set 50 as a PSTN terminal. The PBX 4 controls call connection among each IP terminal and the PSTN terminal in addition to mutual extension communication among the IP terminals 11-1, 5, 21-2n.

The SIP network 100 is provided with SIP servers 61, 62 which form a redundant system with each other. The SIP servers 61, 62 each have SIP processing functions, and perform call connection processing in order to form a communication link between a transmission source and a call termination destination. Among of the SIP servers 61, 62, the SIP network 100 makes the SIP server 61 function as a primary server, makes the SIP server 62 function as a secondary server, and prepares for a failure of the SIP server 61. However, both the SIP servers 61, 62 may fail.

SIP network 100 additionally includes another private telephone network. The private telephone network is provided with an exchange 7 and telephone terminals 81-8m. The SIP network 100 and the PSTN 200 are mutually connected via a gateway (not shown), etc. Thereby, any of the terminals shown in FIG. 1 may communicate with one another without being aware of a network interface. In this way, the telephone system in FIG. 1 realizes inter-terminal voice communication through SIP by taking the SIP network 100 as a core.

According to the embodiment, FIG. 2 exemplary shows a functional block diagram illustrating an embodiment of the PBX 4 of FIG. 1. The PBX 4 includes a central processing module 41, a memory 42, a switch 43, an analog trunk 44 and a SIP trunk 45. The analog trunk 44 is connected to the PSTN 200 to convert interface between the PSTN 200 and a service inside. The SIP trunk 45 is connected to the SIP network 100 to extract a time-division multiplex signal from IP packets. The switch 43 is connected to the LAN to mutually convert and connect among the SIP network 100, the PSTN 200 and the LAN.

The SIP trunk 45 includes a SIP call control module 45a, and a SIP server monitoring module 41b. The SIP call control module 45a controls SIP transmission. The SIP server monitoring module 45b periodically monitors the statuses of the SIP servers 61, 62. The monitoring results are stored and managed in a table form in a server status management table 45c. After detecting failures in all the SIP servers 61, 62, the SIP server monitoring module 45b deactivates the SIP trunk 45. Similarly, the analog trunk 44 has a function of monitoring the PSTN 200. The status (active or inactive free) of the analog trunk 44 is also periodically monitored. The status (failure inactive or active) of the SIP trunk 45 is stored in table form in a trunk status management table 42a (memory 42) and managed in addition to the status of the analog trunk 44.

Each module is integrally controlled by the central processing module 41. The central processing module 41 is provided with a call control module 41a. When generating a transmission (a SIP trunk transmission request) to the SIP network 100, the call control module 41a firstly refers to the trunk status management table 42a. If the SIP trunk is inactive, the call control module 41a immediately transfers the transmission request to the analog trunk 44 to perform the detour transmission to the PSTN 200.

According to the embodiment, FIG. 3 exemplary shows a schematic view for explaining processing by the SIP server monitoring module 45b. The SIP server monitoring module 45b periodically transmits inquiry messages to the respective SIP server 61, 62. If normal responses to the inquiries are received, the SIP server monitoring module 45b determines the monitoring result from the SIP servers at the inquiry destinations to be "OK", registering the "OK" in the table 45c. In the absence of normal responses, the monitoring module 45b determines the monitoring result to be "NG", registering "NG" in the table 45c. FIG. 3 shows that any failure occurs at the SIP server 62. If the statuses of the SIP servers 61, 62 become "NG", the SIP trunk 45 is deactivated due to the failure (brought into failure inactive), and the fact is registered in the trunk status management table 42a.

The server status management table 45c registers each result ("OK" or "NG") of the statuses of the plurality of SIP servers belonging to the SIP network 100. The SIP server monitoring module 45b registers the monitoring results of the SIP servers in the table 45c. When all the statuses of the SIP servers are made "NG", the SIP server monitoring module 45b sets failure inactive of the SIP trunk 45 to register the fact in the trunk status management table 42a. After this, if at least one of the statuses of the SIP servers is made "OK", the monitoring module 45b activates the SIP trunk 45 from inactive to register the fact in the management table 42a.

The failures of the SIP server include an access failure due to a defect of a communication path in addition to a functional failure of a SIP server itself.

In the embodiment, "OPTIONS" messages defined in SIP are used in order to monitor the statuses of the SIP servers. That is, the SIP servers 61, 62 are monitored by a broadcast transmission of the "OPTIONS" messages to the SIP servers 61, 62 SIP servers and by monitoring the responses.

The "OPTIONS" message is originally a message for use in inquiry of ability (a type, etc., of a function of being supported by a resource) of a resource. The "OPTIONS" message is only a message which has no effect on a network among each message defined by SIP. Therefore, "OPTIONS" is a message which can be used for the broadcast transmission rather than for polling, and may obtain a result only by waiting one time-out (32 seconds) even if the number of the resources (SIP servers) is large. In this embodiment, monitoring the response of the SIP server to the "OPTIONS" message detects the presence or absence of the failure.

Figure 4:
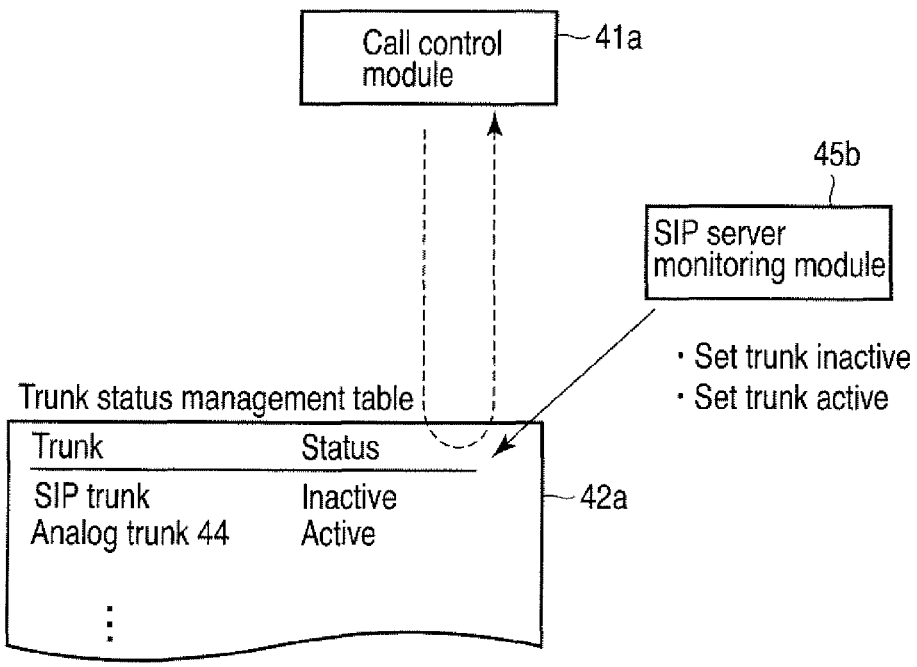

According to the embodiment, FIG. 4 exemplary shows a schematic view for explaining the processing by the call control module 41a. In FIG. 4, the status (inactive or active) of the SIP trunk 45 is registered in the trunk status management table 42a in real time by the SIP server monitoring module 45b. When a transmission request is made from this status, the call control module 41a firstly refers to the management table 42a. If the transmission terminal is the IP terminal 11, the transmission request which has been made is the SIP transmission request to the SIP network 100. In this case, the status of the SIP trunk 45 is referred to. According to FIG. 4, the SIP trunk 45 has been deactivated due to the failure. Therefore the call control module 41a performs the detour transmission to the PSTN 200. The following will describe operations of the configuration of the above in detail.

According to the embodiment, FIG. 5 exemplary shows a schematic view illustrating the SIP trunk transmission in the normal status (active) of the SIP trunk 45. The SIP server monitoring module 45b periodically transmits the "OPTIONS" message to the SIP servers 61, 62 to monitor the monitoring results. If the monitoring module 45b receives a 200 OK ("OPTIONS" message) response, the SIP server which transmitted this response is normal. Even if the SIP server of the destination does not support the "OPTIONS" message, the return of an error response ("OPTIONS" message) results in the SIP server being determined to be normal.

From this status, when the IP terminal 11 (transmission terminal) executes SIP trunk transmission to a telephone set (call termination terminal) 50, the call calling module 41a of the PBX 4 acquires the status of the SIP trunk 45 from the trunk status management table 42a. Since the SIP trunk 45 is in active status, the call control module 41a transmits a transmission request to the SIP call control module 45a as usual. Then, the "INVITE" message is transmitted to the SIP network 100 to start a usual call connection sequence. After this, the transmission is terminated at the telephone set 50 from the SIP network 100 via the PSTN 200.

According to the embodiment, FIG. 6 exemplary shows a schematic view illustrating a transmission in an inactive status of the SIP trunk 45. If the failure occurs on the SIP network 100, the "OPTIONS" messages from the SIP server monitoring module 45b do not arrive at the SIP servers 61, 62. Thus, the responses from the SIP servers 61, 62 do not return to the monitoring module 45b. If this status has lasted during a 32-second period after the transmission of the "OPTIONS" messages, the process of the transmission times out. Based on this time-out, the SIP monitoring module 45b sets the monitoring result to "NG" to record "NG" in the server status management table 45c. In the failed statuses of the SIP servers 61, 62, no response returns similarly to result in "NG". After all the SIP servers 61, 62 result in "NG", the monitoring table 45b records that the SIP trunk 45 has been brought into inactive in the trunk status management table 42a.

From this status, it is assumed that the SIP trunk transmission is from the IP terminal 11 to the telephone set 50. The call control module 41a then detects that the SIP trunk 45 has been deactivated from the content of the trunk status management table 42a. The call control module 41a then immediately transfers a transmission request to the analog trunk 44. Thereby, the call connection sequence is started on the side of the PSTN 200. In this way, the originated call, detouring to the analog trunk 44, terminates at the telephone set 50.

According to the embodiment, FIG. 7 exemplary shows a flowchart illustrating the processing procedure of the PBX 4 of the embodiment. The SIP server monitoring module 45b transmits the "OPTIONS" messages to the SIP network 100 (Block B1) to monitor the presence or absence of the normal response (Block B2). If any normal response is absent (No, Block B2), the SIP server monitoring module 45b deactivates the SIP trunk 45 (Block B3) to update the trunk status management table 42a (Block B4). Even if the normal response is present (Yes, Block B2), the SIP server monitoring module 45b updates the management module 42a. The procedure is periodically continued until the transmission (transmission request) is made.

If the transmission request is made (Yes, in Block B5), the call control module 41a refers the management table 42a (Block B6), and acquires the status of the SIP trunk 45 in response to the SIP transmission request. If the SIP trunk 45 has not been inactive (No, Block B7), the SIP trunk 45 transmits the "INVITE" message as usual. If the SIP trunk 45 has been inactive (Yes, Block B7), the detour transmission is performed from the analog trunk 44 (block B8).

As described above, in this embodiment, the PBX 4 performs the broadcast transmission of "OPTIONS" messages to all the SIP servers which belong to the SIP network 100 and are capable of being accessed. By monitoring the responses, the PBX 4 periodically monitors the status of each SIP server. If any responses (200 OK or error response) are received, the PBX 4 determines that the SIP servers which have responded are normal, and if no responses are received, the PBX 4 determines that the non-response SIP server has failed. Such a result of monitoring is recorded in the server status management table 45c, and the status of each SIP server is managed on the basis of the table 45c.

If all the SIP servers fail, the PBX 4 deactivates the SIP trunk 45 to record the fact in the trunk status management table 42a. According to such a processing procedure, the PBX 4 can determine the status of the trunk in real time before the transmission request is made, and if the transmission request is made, the PBX 4 can immediately perform the detour transmission to the normal trunk.

In the embodiment, using the "OPTIONS" messages detects the respective statuses of the SIP servers. The "OPTIONS" messages are suitable for use in the broadcast transmission. Therefore, the PBX 4 may immediately acquire the results of monitoring to all the SIP servers, and may increase the frequency of the monitoring. Further, even in a system which does not support the "OPTIONS" messages, since some responses are returned, the PBX 4 becomes more general-purpose than a case of use of "REGISTER" messages. In this way, the embodiment makes it possible to provide the telephone system configured to perform the detour transmission quickly and accurately, its exchange, and the transmission control method.

The present invention is not limited to the specific details and representative embodiments shown and described herein. For instance, while the embodiment has exemplified only the SIP trunk 45, the analog trunk 44 and the two trunks, the invention makes it possible to target ISDN trunks and treat a larger number of trunks in a similar way. It is also preferable to group a plurality of trunks and perform a detour transmission only among trunks in each group. In this case, it is effective to manage the trunks by assigning trunk group numbers to each trunk.

While the embodiment has described the detour destination is set to the analog trunk 44 in the failure of the SIP trunk 45, the reverse way is a possible approach. That is, the detour destination may be set to the SIP trunk 45 in the failure of the analog trunk 44. In other words, it is not always necessary to register the SIP trunk 45 at the top of the call processing procedure, the detour destination may be set to the SIP trunk 45 in the failure inactive of the analog trunk 44.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone system which realizes voice communication by using a packet network being an Internet Protocol network, comprising:
   an exchange which accommodates a telephone terminal as its extension; and
   call processing servers which process calls on the packet network by means of Session Initiation Protocol, wherein
   the exchange comprises:
   a first trunk connected to the packet network;
   a second trunk connected to a public network having a different protocol from that of the packet network;
   a server status management table configured to be used to register the status of the call processing servers;
   a trunk status management table configured to be used to manage the status of the first trunk;
   a monitoring module which monitors the call processing servers, registers the result of a monitoring in the server status management table, and when failures occur in all call processing servers, deactivates the first trunk, the monitoring module periodically transmits inquiry messages to the call processing servers, and if no response to the inquiry message is returned, deactivates the first trunk; and a call control module which acquires the status of the first trunk from the trunk status management table when a transmission request is arrived from the telephone terminal, transfers the transmission request to the second trunk and performs a detour transmission to the public network when the first trunk is inactive.

2. The telephone system according to claim 1, wherein the inquiry message is an "OPTIONS" message defined by SIP.

3. The telephone system according to claim 1, wherein the monitoring module broadcasts inquiry messages to the call processing servers.

4. An exchange which is provided for a telephone system realizing voice communication using a packet network being an Internet Protocol network by means of call processing servers for processing calls on the packet network in accordance with Session Initiation Protocol and which accommodates a telephone terminal as an extension, comprising:

a first trunk connected to the packet network;

a second trunk connected to a public network having a different protocol from that of the packet network;

a server status management table configured to be used to register the status of the call processing servers;

a trunk status management table configured to be used to manage the status of the first trunk;

a monitoring module which monitors the call processing servers, registers the result of a monitoring in the server status management table, and when failures occur in all call processing servers, deactivates the first trunk, the monitoring module periodically transmits inquiry messages to the call processing servers, and if no response to the inquiry message is returned, deactivates the first trunk; and a call control module which acquires the status of the first trunk from the trunk status management table when a transmission request is arrived from the telephone terminal, transfers the transmission request to the second trunk and performs a detour transmission to the public network when the first trunk is inactive.

5. The exchange according to claim 4, wherein the inquiry message is an "OPTIONS" message defined by SIP.

6. The exchange according to claim 4, wherein
the monitoring module broadcasts inquiry messages to the call processing servers.

7. A Transmission control method of an exchange which comprises a first trunk connected to a packet network being an Internet Protocol network and a second trunk connected to a public network having a different protocol from that of the packet network, comprising:

periodically transmitting inquiry messages to at least one call processing server and closing the first trunk, if no response to the inquiry message is returned;

monitoring call processing servers provided with the packet network, the call processing servers process calls by means of Session Initiation Protocol;

registering the result of the monitoring in a server status management table;

deactivating the first trunk and registering the fact in a trunk status management table when the fact that failures occur in all call processing servers is registered in the server status management table;

acquiring the status of the first trunk from the trunk status management table when a transmission request is arrived from the telephone terminal;

transferring the transmission request to the second trunk and performing a detour transmission to the public network when the first trunk is inactive periodically transmitting inquiry messages to the call processing server; and closing the first trunk, if no response to the inquiry message is returned.

8. The method according to claim 7, wherein the inquiry message is an "OPTIONS" message defined by SIP.

9. The method according to claim 7, wherein
the inquiry message is broadcasted to the call processing servers.

* * * * *